United States Patent Office 3,497,477
Patented Feb. 24, 1970

3,497,477
PROCESS FOR REMOVING METALLIC ANTIMONY FROM POLYESTER PREPOLYMERS
Kenneth T. Barkey and Walter L. Predmore, Jr., Rochester, N.Y., assignors to Eastman Kodak Company, Rochester, N.Y., a corporation of New Jersey
No Drawing. Continuation-in-part of application Ser. No. 549,500, May 12, 1966. This application June 2, 1969, Ser. No. 829,780
Int. Cl. C08g 17/013
U.S. Cl. 260—75         4 Claims

ABSTRACT OF THE DISCLOSURE

Sometimes when linear superpolyesters such as poly(ethylene terephthalate) are manufactured using catalysts containing antimony and stabilized with phosphite stabilizers, the antimony in the catalyst system is reduced to the metallic state, thereby imparting an undesirable gray color to the polyester. This "gray polyester" problem was most troublesome when the polyester was produced via the so-called "solid phase" polymerization technique, in which powdered polymer is suspended for a hot inert gas stream in the fluidized condition, and in which the hot insert gas stream is recycled through a molecular sieve. The generic processes, over which the present invention is a distinct improvement, are described in detail in U.S. Patent 3,330,809.

---

This is a continuation-in-part of U.S. Ser. No. 549,500, filed May 12, 1966.

This invention relates to the preparation of linear superpolyesters of a glycol and a dibasic acid having a molecular weight of at least about 15,000 and ranging upward to 100,000 or more and having an intrinsic viscosity of at least about 0.6. More particularly, this invention relates to novel processes for manufacturing polyesters, which process involves the use of at least one antimony polyesterification catalyst.

The preparation of polyesters by esterification or ester exchange and condensation is well known. In the case of poly(ethylene terephthalate), for example, it is customary to react dimethyl terephthalate with ethylene glycol to form a low molecular weight polymer (i.e., prepolymer) and by-product methanol. After the methanol is nearly completely removed, the reaction temperature is raised and remaining ethylene glycol is removed. The reaction is then continued until a polyester of the desired molecular weight is obtained. The molecular weight of the product may be high enough that the polyester can be used for forming films and fibers. Such a system, whether batch or continuous, is known as a melt polymerization process. In accordance with such process, the polymerization can be continued until a polyester is obtained or the melt process may be stoped at some intermediate point to obtain a prepolymer, i.e., a polymer having a molecular weight of from about 2,000 to about 10,000 and having an intrinsic viscosity of about 0.1 to about 0.55. This material can be stored and subsequently polymerized by remelting and continuation of the melt process or, more advantageously, it may be crystallized, ground and subjected to solid phase polymerization either by batch or continuous processes.

It is known that the preparation of polyesters from a glycol and a dibasic acid is facilitated by the use of catalysts and that polyesterification is reversible, equilibrium reaction which may be exemplified as follows:

$$RCOOR^1 + R^2OH \rightleftharpoons RCOOR^2 + R^1OH \qquad (1)$$

wherein, for poly(ethylene terephthalate) for example, R represents  $CH_3OOC$-phenyl, $HOCH_2CH_2OOC$-phenyl or $H(OCH_2CH_2OOC\text{-phenyl-}CO)_xOCH_2CH_2OOC$-phenyl; $R^1$ represents —$CH_3$ or —$CH_2CH_2OH$ and $R^2$ represents $HOCH_2CH_2$— or

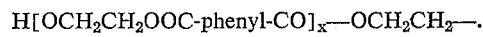 $H[OCH_2CH_2OOC\text{-phenyl-}CO]_x\text{—}OCH_2CH_2\text{—}$.

The catalysts which may be used in the preparation of polyesters, such as described above, include organic and inorganic compounds of metals such as titanium, antimony, zinc, lead, calcium, lithium, combinations thereof, etc., heretofore utilized by those skilled in the art. The prior art, for example, discloses a great number of such catalysts, some of which are described in patents such as U.S. 2,465,319, U.S. 2,720,502 and U.S. 2,727,881 and others. Specific catalysts heretofore known and which are utilized herein, include titanium tetrabutoxide or isopropoxide, titanium dioxide, zinc, acetate, zinc acetyl acetonate, lead oxide, calcium oxide, lithium ethoxide, antimony trioxide, antimony hydroxide, antimony salts such as antimony sulfate, antimony acetate, and antimony chloride, manganese oxides and the like.

The present invention is directed specifically to certain improved processes which involve the so-called solid phase polymerization procedure in which the molecular weight of powdered polyester prepolymer is "built up" by heating the powder with a hot inert gas stream while the powder is in a "fluidized" condition in a conventional polyester polymerizer such as that described in great detail in U.S. Patent 3,330,809. In that patent it is pointed out that contemporary, efficient, commercial processes for manufacuring polyester (via solid phase polymerization) involve the following steps:

(1) Introducing the prepolymer powder into a polymerization zone equipped with (a) zone wall temperature control means and (b) gas distribution means;

(2) Continuously passing inert gas at from about 150 to about 300° C., through the bed of said prepolymer powder at a rate of at least 2 times the minimum fluidization rate, whereby the powder is maintained in the fluidization zone in the fluidized condition, the temperature during polymerization being within the range of from about 15 to about 75° C. below the melting point of the powder;

(3) Continuing the passage of said gas into said fluidized powder at a rate of from 2 to 8 times the minimum fluidization rate within said build-up temperature range until an intrinsic viscosity of at least 0.55 is obtained for the build-up polymer powder;

(4) Continuously transferring said gas containing some of said powder, after it has passed through said fluidized powder, into a separation zone where substantially all particles of powder in said gas are separated from said gas leaving a substantially clear gas;

(5) thereafter continuously passing said gas through at least one condenser whereby substantially all of said glycol in the form of vapor in said gas is condensed leaving a substantially purified clear gas;

(6) Thereafter continuously passing said gas through a zeolitic molecular sieve capable of removing molecules having critical diameters within the range of from about 3 up to about 20 angstrom units, whereby essentially purified gas is obtained; and (7) When an intrinsic viscosity of at least 0.55 has been achieved, removing at least some of said built-up powder from said polymerization zone.

In such processes which are extremely efficient, substantially all of the organic materials, in the inert gas stream (such as aldehydes, water and methanol in small amounts and ethylene glycol, all of which are evolved from the hot, polymerizing powder while it is suspended in the gas stream) are removed from the inert gas stream before it is recycled to the fluidized bed.

Thus, there are three major characteristics by which the processes, over which the present invention is a significant improvement, can be readily identified:

(1) They involve a solid phase polymerization, with powdered prepolymer particles being contacted and maintained in a fluidized condition with hot inert gas;

(2) The hot, inert gas is recycled (a) through the bed of particles (where it picks up water and some organic materials, especially ethylene glycol), (b) then through a molecular sieve, whereby practically all of the water and organic materials are removed from the gas, and (c) then back to the fluidization zone, wherein the hot gas is ordinarily maintained to be practically free of organic materials at all times during the polymerization; and (3) Continuous contact of the fluidized particles with hot (recycled) inert gas that is substantially free of organic materials.

The present invention also relates specifically to those polyesterification processes described above that involve the use of an antimony polyesterification catalyst as at least one component of the catalyst system. Other (non-antimony) polyesterification catalysts can be utilized in the overall processes of this invention if it is desired to do so. For example, for manufacturing poly(ethylene terephthalate), a combination of polyesterification catalysts, including (in addition to antimony) one or more zinc salts such as zinc acetate, is generally preferred.

While the use of an antimony polyesterification catalyst is desirable for several reasons which are well known to those in the art, such use heretofore often resulted in special problems, apparently because under certain conditions (for example, due sometimes to the presence of reducing type stabilizers such as the trialkyl phosphites) some of the antimony catalyst was reduced to metallic antimony, which not only caused a generally undesirable gray color to be imparted to the polyester product, but also caused filter plugging and even resulted in excessive film specks and fiber breakage, and/or discoloration when the superpolyester product was converted into such end-use materials. Efforts heretofore to consistently cure these problems caused by the presence of metallic antimony), for example, by oxidizing the metallic antimony to an oxidized state (such as antimony oxide, in which form the antimony is both colorless and soluble in the polyester system) by simply passing oxygen over or through a heated bed of polyester material containing the troublesome metallic antimony, were unsuccessful.

This problem became known as the "gray polyester" problem. Apparently the problem occurred only during solid phase polyesterification reactions. Also, the problem is apparently unique to those solid phase processes in which the above-described molecular sieve) procedure for efficiently removing practically all of the organic contaminants from the hot gas stream; although this particular factor was not readily recognizable because "gray polyester" was not produced often, or in any predictable manner.

It has now been discovered that the "gray polyester" problem can be solved consistently, not simply by oxidizing the metallic anitmony, per se; but by the surprising expedient of oxidizing a non-antimony bearing material concurrently with the metallic antimony, apparently at the sites of the tiny specks of antimony metal in the effected polymeric materials. For some present unexplainable reason, the desired oxidation of metallic antimony can apparently only be carried out in conjunction with the oxidation of another component, which other component contains no antimony. Since in the processes with which the present invention is concerned it is necessary to prevent the effected polymeric material from melting, the "oxidizable material" (that is oxidized concurrently with the metallic antimony in the processes of this invention) must be of the type that can be oxidized in the presence of oxygen at a temperature between about 250° F. and the melting point of the particular effected polyester being treated (preferably at a temperature between about 230° F. and about 420° F.) when superpoly(ethylene terephthalate), for example, is being made in the present processes. Illustrative of the type of "oxidizable materials" that can be utilized in the present processes include acetaldehyde, ethylene glycol, methanol, formaldehyde, crotonaldehyde, ammonia, borohydride, 2-methyl-1,3-dioxolane, isopropanol, and ethanol. "Oxidizable materials" that are volatile at ordinary process temperatures in the inert gas streams (which are preferably largely nitrogen gas) used to blanket the polyester during the latter stages of the polymerization processes are preferred for optimum results in the practice of the present processes. Generally at least about 0.005 weight percent (and preferably at least about 0.05 weight percent) of such volatile "oxidizable materials" should be present in the inert gas stream which is in intimate contact with the polyester during at least a portion of the time during which the polyester is exposed to temperatures above about 300° F. in order to convert at least a portion of the troublesome metallic antimony to the oxidized state. If desired, up to about 5 weight percent or more of the "oxidizable material," based on the weight of polyesterification reactants, can be present in the reaction system (including the gas stream, although generally, no more than about 1 weight percent of these materials need be utilized in order to attain substantially complete conversion of the undesired metallic antimony to the oxidized state.

Oxygen can be furnished to the sites where it is needed for the above-described desired oxidation by several means. For example, it can be furnished in the form of a compound that can be thoroughly intermixed with the polymer product containing the metallic antimony. For this purpose, any of the well known oxidizing agents that are not detrimental to the catalyst system and to the polyester itself (keeping in mind the desired end use of the polyester) can be utilized. Thus, preferred oxidizing agents are, for example, oxygen, chlorine, hydrogen peroxide, hypochlorous acid, nitric acid, sodium peroxide, and peracetic acid. Note that by use of this type of oxidizing agent, the reduced residues of the oxidizing agents are volatile and can readily be removed from the polymerization reaction zone if and when such removal is desired. Care must be taken in the use of oxidizing agents under the polyesterification-oxidzation reaction conditions specified above in order to avoid undesired explosions and/or fires that sometimes result from the presence of excessive amounts of oxidizing agents in admixture with finely powdered organic material. Thus, for the sake of safety, generally no more than about ten percent oxygen or its equivalent can be tolerated in the inert gas in the reaction zone at any one time. When solid oxidizing agents are utilized, this figure represents the oxygen equivalent of the total amount of oxidizing agent in the reaction system.

Of the oxidizing agents that can be used in the successful practice of this invention, oxygen gas (in admixture with the inert environmental gas) at levels of from about 0.5 to about 10, and preferably at levels of from about 1.5 to about 8, volume percent of the inert gas stream or atmosphere should be utilized (in conjunction with the aforementioned "oxidizable material").

For conversion of most of the metallic antimony to the oxidized state, generally the oxidizing conditions set out above should be maintained until the desired result is accomplished; this is generally for at least about 10 minutes, and preferably for at least about 20 minutes, and up to about *120 minutes or more*, depending on several factors. Generally the rate of the desired oxidation increases with increasing temperatures, and it is usually desirable to stop the exidation, preferably by reducing the amount of oxygen in the gas stream environment to below about 1 volume percent, fairly quickly after the desired amount of oxidation (of metallic antimony) has been accomplished. This can readily be accomplished by simply purging the system with large volumes of inert gas, or by chemically removing the oxygen from the environmental gas stream, or by any of a number of other means known to the ordinarily skilled chemist. The main reason for limiting the amount of time the oxidizing conditions are maintained in these processes is to prevent or minimize deterioration of the polyester, itself (i.e., to thereby prevent the development of discoloration caused by oxidation in the end product superpolyester).

The basic polyesterification processes to which this invention relates are well known to those in the art and for this reason need not be extensively detailed here. The processes entail, for example, the use of a total polyesterification catalyst concentration of from about 10 to about 3000 parts per million, based on the weight of the reactants, although the usual range is from about 20 to about 1000 parts per million, and preferably from about 50 to about 500 parts per million. Of this, the total antimony polyesterification catalyst concentration at the beginning of the polyesterification reaction is generally from about 50 to about 500 p.p.m., and preferably within the range of from about 100 to about 250 p.p.m.

According to a preferred embodiment of this invention there is provided a process for preparing a linear superpolyester of at least one glycol and at least one dibasic acid comprising at least 50 mole percent of an acid having two carboxyl radicals attached to a carbocyclic nucleus having from 4 to 6 carbon atoms per ring, said superpolyester having a number average molecular weight of 15,000 to about 100,000, having an inherent viscosity in a mixture of 60% phenol and 40% tetrachloroethane of at least 0.50 and melting at from about 180° to about 350° C., and preferably having been prepared as follows:

(1) Heating from about 1 to about 3.5 mole proportions of said glycol with one mole proportion of said dibasic acid in a form selected from the group consisting of the free acid, a lower alkyl (1 to 6 carbons) ester, anhydride and acid chloride, under conditions such that at first there is removed substantially all of any water, alkanol, and/or hydrogen chloride corresponding to said forms of said dibasic acid, and subsequent thereto thereto there is removed most of the excess of said glycol whereby an intermediate polyester prepolymer having an inherent viscosity of from about 0.1 to about 0.45 is obtained, said conditions being such that after any water, alkanol, and/or hydrogen chloride has been removed and before any substantial amount of said glycol is removed there is present catalyst(s) to promote the preparation of a monomer, which can then be further polymerized to form a still higher molecular weight material, commonly called "prepolymer."

(2) Comminuting said "prepolymer" to form solid particles substantially completely passing a 20 mesh screen, preferably with less than 10 percent passing a 200 mesh screen, and then (3) In an enclosed polymerizing zone wherein at least 5% of the volume is occupied by said particles, heating at from about 5° to about 80° C. below the melting point of said prepolymer (between 175° and 300° C.) in the presence of a solid phase polyester polymerization catalyst and an inert gas at about atmospheric pressure which flows through said zone at from about 0.01 to about 100 ml. of inert gas per minute per gram of said particles, any of said particles more than 5 mm. from the surface being agitated into contact with said inert gas, whereby a substantially colorless superpolyester having an inherent viscosity of at least 0.5 and generally greater than 0.6 is obtained within ten hours or less of commencing said heating in said polymerization zone, said inherent viscosity being at least 0.3 unit greater than for said prepolymer and usually 0.4 or more units greater.

The detailed aspects of the described process will be readily apparent to those having ordinary skill in this art since the preparation of polyesters such as poly(ethylene terephthalate) which are fiber and film forming has now been understood by such persons for a good number of years and the literature and patented art are quite extensive in regard to this subject matter. It is therefore unnecessary to indulge in a lengthy discussion of numerous ramifications of this invention which would be readily apparent.

The inert gas which can be employed in accordance with the process of this invention can be any of those which are ordinarily employed in the handling of polyesters in accordance with the prior art. Such inert gases include nitrogen, carbon dioxide, hydrogen, helium, propane, mixtures of such gases and other related gases.

Phase 1 as set forth hereinabove can be conducted as a single operation or can be divided into two separate steps. In the latter case it is sometimes advantageous to perform an initial ester interchange between the glycol and the dibasic acid (ester) components in a batch reactor or in a column equipped with plates. Of course other apparatus can also be employed. The reactor or column is advantageously equipped with a reflux device such as a packed column which returns to the reaction zone any of the glycol which might otherwise be lost during the ester interchange step. The lower alkanol (originally part of the dibasic acid ester starting material) is removed from the ester interchange zone. The second step of this first phase can then be accomplished advantageously by heating the ester interchange product in a batch reactor or some other suitable reaction vessel so as to remove a substantial proportion of the glycol in excess of that required to form a polyester. This step is normally advantageously accomplished under reduced pressure which facilitates the removal of the glycol. During this step, "prepolymer" is usually formed.

The second phase of the described process, involving the comminuting of the prepolymer, can be accomplished in any convenient manner as long as the particles produced come within the size requirements set forth. According to one method the prepolymer can be cast as a thick sheet of the product of phase 1 and allowed to cool slowly whereby it can be readily broken into small pieces. These pieces can then be ground in any of the commonly available grinding machines so as to produce particles of the appropriate sizes. The slow cooling of the prepolymer as a thick sheet facilitates its developing a crystalline form which makes subsequent comminution relatively easy. It has been observed that it is generally during this phase of the generic polyesterification processes that most of the objectionable metallic antimony is apparently formed, especially if a material having a reducing capability (such as, for example, trialkyl phosphite) is present in the reaction mass. Crystallization with regard to the material used to form the comminuted particles is not only useful in preparing the comminuted particles, but it is also advantageous in accomplishing the final polymer buildup.

If it is desired to enhance the crystallinity of the particles of prepolymer to be used as set forth in phase 2, this can be accomplished by contacting the particles with an organic volatile liquid compound which is allowed to permeate the particles for a period of time sufficient to permit a high order of crystallization to be achieved. The particles containing the volatile organic liquid can then be heated at an adequate temperature to evaporate the the liquid and leave the particles dry. If necessary, the dried particles can be subjected to further mechanical action to cause them to have the appropriate sizes.

In preparing the solid particles of prepolymer it is generally advantageous to employ a prepolymer which does not have an intrinsic viscosity any greater than about 0.4–0.45. Usually the prepolymer will have an intrinsic viscosity of no less than about 0.1 and preferably 0.15–0.4.

The solid phase operation is conducted in an enclosed polymerizing zone wherein at least 5% of the volume is occupied by the particles. Such a zone can be a horizontal tube, upright cylinder or any other chamber through which inert gas can be conveniently moved across the surface of the particles and/or around the particles. Vacuum could also be used for solid phase polymerization, but there are complications when large equipment is used.

There is no clear cut range of flow rates for the inert gas passing over the surface or through (around) the prepolymer particles since the effectiveness of the flowing gas depends to a considerable extent on the geometry of the polymerizing zone. However, it appears that a range of from about 0.01 to about 1,000 ml. of inert gas per minute per gram of the solid particles covers about as much variation in flow rate as appears ordinarily practicable. An excessively high flow rate will obviously be economically wasteful since it will require employment of more heat in order to maintain the powder buildup conditions in the polymerizing range of temperatures.

The particles in the polymerizing zone can be advantageously heated initially at about from 40° to 80° C. below the melting point of the prepolymer. The most effective polymerization temperature depends upon the nature of the polyester and upon the type of catalyst employed. Generally the initial polymerization temperature is about 200–260° C. although higher and lower temperatures are operable such as 180–425° C., depending upon the melting behavior of the polyesters.

According to one preferred method of practicing this aspect of the present invention, a prepolymer is finely ground to form solid particles in the 40 to 70 mesh size which are heated in a horizontal or vertical glass of metal tube at the polymerization temperature in the presence of a standard powder buildup (i.e., polymerization or polyesterification) catalyst until the desired increase in the molecular weight of the polyester is obtained. The degree and rate of molecular weight buildup of the prepolymer is somewhat dependent upon the catalysts used, the particle size, the polymerization temperature, the rate of flow of the inert gas over the bed of prepolymer, the thickness of the bed of prepolymer, and the diameter of the reaction tube or bed.

Primarily, it has been found that the concentration and the particular ester interchange catalyst, and the particular combination of powder buildup catalysts will affect the rate of the molecular weight buildup. It has been found that this process under optimum conditions provides high grade polyesters which can be obtained with high intrinsic viscosities within relative short reaction periods of time and at temperatures far below the melting points of the polyesters.

The particle size of the prepolymer is advantageously between 30 and 70 mesh, particularly when it is desired to use a "fluidized bed" technique for phase 3; although larger or smaller particles may be employed within the limits set forth above. Larger size particles tend to slow down the rate of molecular weight buildup. The presence of a very high proportion of particles passing 200 mesh (such as about 10% or more) is undesirable since such particles tend to be picked up by the moving gas and carried away. Generally, however, the average particle size (diameter) of the prepolymer is below about 600 microns.

One way for accomplishing the powder buildup is to conduct the polymerization in apparatus which maintains the solid particles in a fluidized condition. Such apparatus is well known in the cement making and the powdered coal handling industries, as well as elsewhere. For example, an upright cylindrical fluidized blender can be employed to suspend and agitate particles with hot inert gas while the walls of the blender are maintained at a temperature adequate to heat the particles to accomplish the polymerization. Additional prepolymer can be added to such a blender on a continuous basis and "built up" particles can be removed as desired.

Another device is to use a somewhat tilted hollow reaction tube which may have a corrugated cross section and which can be rotated around its longitudinal axis. Prepolymer powder can be introduced into the higher end of the tube and insert gas passed through the tube, preferably through the opposite end. The tube can be designed so that the particles of prepolymer will remain within the tube for a desired period of time while the tube is being rotated. The particles then move downwardly according to the degree of slope of the tube. By using such a rotating tube apparatus the particles of "build up" polymer have a substantially uniform intrinsic viscosity and are quite advantageously employed for products where a relatively narrow range of molecular weights is desirable, such as in the manufacture of photographic film base or fibers.

The temperature at which the polymerization during the powder buildup is conducted should not be so high as to cause non-frangible agglomeration of the particles during the solid phase polymerization. The maximum temperature which can be employed will be determined by the precise conditions employed. By the "avoidance of nonfrangible agglomeration," it is meant that the material should not fuse together completely, but should remain in a form such that it is quite frangible and can readily be broken up after the polymerization has been completed. As has already been pointed out, the desired agitation during "phase 3" can be accomplished by means of the inert gas (which can be heated) being passed through the particles of the solid polymer as in the case of fluidization. Agitation can also be accomplished by stirring the particles in an enclosed polymerizing zone or by other means such as when the previously described rotating tube is employed. Agitation is especially important if the depth of the polymer bed is 5 mm. or more. A static bed can be employed when the depth of polymer is less than 5 mm.; preferably no more than about 3 mm. Of course static beds having depths greater than 5 mm. could be employed with some adverse effects upon the results achieved.

When a "bed" of prepolymer is employed in a substantially horizontal (rotatable) tube, the thickness of the bed can be between about 1% and 25% of the diameter of the reaction tube. Such a bed can be established within the larger sizes of reaction tubes by placing it upon a substantially horizontal and flat supporting surface across the lower half of the tube. Such a bed would then constitute at least 5% of the volume of the polymerizing zone above the supporting surface. The maximum volume of the bed in the zone in such a case would be limited by the practical problems associated with the flow of inert gas over the bed.

In cases where the polymerizing zone involves apparatus which fluidizes the particles, it is possible for the fluidized material to occupy a fairly major proportion of the total polymerizing zone. The same would be true when other devices are being used for agitating the prepolymer particles and passing the inert gas through the agitated mass. In such cases, much of the volume of the polymerization zone is filled with the gas used to fluidize the particles and such gas occupies the intersitices between the particles.

It is obvious that there are numerous variations of the process of this invention among which would be the employment of mixtures of prepolymer particles using differing prepolymers.

The practice of this invention provides a rapid, efficient process for obtaining colorless fiber and film forming polyesters having exceptionally high molecular weights by simple economical means. The process of this invention is well adapted to continuous operation.

This invention can be further illustrated by the following examples, although it will be understood that these examples are merely illustrative, and are not intended to limit the scope of the invention unless otherwise specifically indicated. In the following examples, all parts given are by weight unless otherwise specified.

The following Example I illustrates one of the conventional procedures for manufacturing poly(ethylene terephthalate) prepolymer in which the formation of troublesome metallic antimony is evident.

Example I

Into a conventional stainless steel reaction vessel fitted with a stirrer and a condenser-collector system (to collect methanol from vapors evolved during the ester interchange) are charged 100,000 parts of molten dimethyl terephthalate, 65,000 parts of ethylene glycol, 465 parts of zinc acetate and 695 parts of antimony trioxide. The zinc and antimony compounds are polyesterification catalysts. The resulting mixture (initially at a temperature of 300° F.) is heated gradually, over a period of about four hours, to a temperature of about 490° F. 0.35. During this time, ethylene glycol is continually withdrawn from the reaction zone, When the temperature has reached 490° F., removal of ethylene glycol, via distillation under reduced pressure is begun. After 25,000 parts of ethylene glycol have been removed [leaving relatively pure low molecular weight poly(ethylene terephthalate)], then the temperature of the reaction mass is increased gradually (over about 1 hour) to about 525° F. Thereafter, this temperature is maintained while the pressure in the reactor is gradually reduced to about 2 mm. Hg. This low pressure is maintained, then, for an additional hour, until the intrinsic viscosity (measured in 60% phenol+40% tetrachloroethane) of the resulting product (generally referred to as a "prepolymer") is about 0.35. During this time, ethylene glycol is continually withdrawn (via distillation) from the reaction mass and the temperature of the mass remains about 525° F. Then the reaction system is brought quickly to atmospheric pressure (with nitrogen), and 100 parts of trioctyl phosphite are blended into the product. The purpose of the phosphite is to stabilize the final polyester product against color degradation (due to oxidation) and also to control aldehydic contaminants in the final polyester product. The molten prepolymer is then quickly poured onto a moving belt and cooled (over a period of about 2 minutes) to a temperature of about 250° F. At this point the prepolymer is solid and largely crystalline and has developed a gray cast or color (due to the presence of metallic antimony or antimony-containing complex). This materail is then ground in a conventional hammer mill into a fine powder (−40, +200 mesh, U.S. Standard). This material is suitable for conversion into the final superpoly(ethylene terephthalate) product via a procedure detailed as phase 3, above. The resulting product, however, will cause plugging of fine screens (used to clean up the product, for example, before extruding it into fine fiber or films); yielding a grayish product with a high particulate count unless the metallic antimony is removed therefrom somehow.

In Example II, below, is illustrated the preferred conventional procedure for converting prepolymer to final superpolyester product via heating the prepolymer while it is suspended (in a "fluidized bed") in a stream of hot inert gas. Following Example II are illustrated various preferred means of practicing the present improved processes.

Example II

One hundred thousand parts of the ground prepolymer prepared as in Example I, above, are placed into a conventional stainless steel fluidizing reactor fitted with means for (a) maintaining fluidized prepolymer in the reactor, (b) recirculating and heating inert gas, which serves both as the fluidizing medium and a heat transfer medium for warming the prepolymer, (c) absorbing ethylene glycol and aldehydic compounds (evolved from prepolymer during the continued polyesterification reaction) and (d) maintaining a slight positive pressure of inert gas in the reactor system (to exclude air), because of the potential explosive and color problems described hereinbefore. The prepolymer is fluidized with hot nitrogen, initially at a temperature of about 325° F. Over a period of about 5 hours the temperature of the fluidized powder is gradually raised to 420% F., where it is maintained for an additional 5 hours until the product has attained an intrinsic viscosity of about 0.65. At this point, the reaction has been completed and the powdered superpolyester (still gray in color) is cooled and stored (under nitrogen) for use in any of a number of end uses, including fiber or film production.

The detailed procedures illustrated in Examples I and II, above, demonstrate how and why the present invention is so surprising. Thus, heretofore, in superpolyester processes involving solid state (powdered prepolymer) polyesterification reactions, it was believed necessary to exclude oxygen or oxidizing agents from the reaction zone (because of the potential safety and color problems about which manufacturers were worried), where it was believed that even a little oxygen might be harmful to product color. Whatever amounts of oxygen that were present in such systems heretofore were generally extremely small, and processors had heretofore continually strived to exclude oxygen from the reaction systems.

Examples III–IX

Samples for data for the following table result from using a prepolymer prepared as in Example I, above. For each of the examples in this series of tests, 1,000 parts of gray prepolymer (initially containing about 500 p.p.m. of antimony, enough of it reduced as metallic antimony or antimony containing complex to give a gray polyester) are poured into a small fluidizer which is equipped, on a smaller scale, just as the fluidizer described in Example II, above, in order to simulate the larger commercial scale process. The initial temperature of the essentially nitrogen gas atmosphere is 425° F. The temperature of the polyester is gradually raised to 420° F. "Time" in Table 1 is in terms of minutes after the beginning of the heating. After eight hours the polyesterification process is complete. Each "additive" is added into the gas stream in these examples, and the "amount" is in terms

TABLE 1.— TREATMENT OF GRAY PREPOLYMER IN NITROGEN GAS ATMOSPHERE

| Ex. | Additive used | Amount | O₂ level | Time | Temp. (° F.) | Remarks |
|---|---|---|---|---|---|---|
| III | None | | 0 | 20 | 205 | Gray. |
| | | | 0 | 50 | 372 | Do. |
| | | | 0 | 110 | 410 | Do. |
| | | | 0 | 410 | 420 | Do. |
| IV | do | | 3 | 20 | 210 | Do. |
| | | | 3 | 50 | 360 | Do. |
| | | | 3 | 400 | 410 | Do. |
| V | Acetaldehyde | 0.1 | 0 | 25 | 320 | Do. |
| | | | 0 | 55 | 400 | Do. |
| | | | 0 | 240 | 411 | Do. |
| VI | do | 0.1 | 4 | 20 | 350 | Do. |
| | | | 3 | 30 | 400 | White. |
| VII | Ethylene glycol | 0.2 | 0 | 25 | 300 | Gray. |
| | | | 0 | 60 | 375 | Do. |
| | | | 0 | 360 | 415 | Do. |
| VIII | do | 0.2 | 4 | 25 | 370 | Do. |
| | | | 3 | 40 | 420 | Changing. |
| | | | 2 | 55 | 420 | White. |
| IX | Ammonia | 0.5 | 3.5 | 25 | 180 | Gray. |
| | | | 3.5 | 30 | 310 | Slt. chg. |
| | | | 3.3 | 35 | 380 | Greenish tint. |
| | | | 3.0 | 40 | 390 | Do. |
| | | | 2.5 | 70 | 420 | Do. |

Note that Examples III, IV, V and VII give negative results because at least one of the critical factors (oxygen or an appropriate "oxidizable material") has been left out of the processes. Examples VI, VIII, and IX illustrate the benefits that can result when the present processes are followed. Of course, similar good results can be obtained when other types of superpolyesters are processed and when other of the "oxidizable materials" and "oxidizing agents" described hereinbefore are utilized in similar fashions. Thus, when solid oxidizing agents are utilized, they can be dispersed through the prepolymer initially, rather than added directly to the gas stream as in these examples.

It should be noted at this point that under certain circumstances the polyesterification reaction itself can serve as the source of sufficient glycol and/or aldehydic "oxidizable material" to accomplish the necessary oxidation of this invention. Under these circumstances, special efforts should be made to retain these materials in the reaction system for a time sufficient to result in the desired reaction (in the presence of sufficient oxidizing agent, of course).

Example X

The gray color in the final powdered superpolyester of Example II can be removed if the material is subjected to the essential conditions set out above, even though the polymerization reaction has been completed, by simply following the details of Example VI, or Example VIII. After thirty minutes exposure at above about 350° F., the material turns white, indicating that essentially complete conversion of the troublesome metallic antimony has been accomplished.

What is claimed is:

1. In a process for manufacturing a superpolyester, which process comprises the steps of
    (a) reacting together in a melt phase via an ester interchange reaction, dimethyl terephthalate and ethylene glycol in the presence of a mixture of polyesterification catalysts comprising an antimony catalyst compound selected from the group consisting of antimony trioxide and antimony salts, and a zinc salt to thereby form a molten prepolymer having an intrinsic viscosity of from about 0.3 to about 0.5;
    (b) cooling said molten prepolymer until it has solidified;
    (c) adding to the reaction mass prior to said cooling step a reducing stabilizer selected from the group consisting of phosphorous acid, monoalkyl phosphite, dialkyl phosphite, and trialkyl phosphite;
    (d) comminuting the resulting solidified prepolymer product to thereby produce a powdered prepolymer having an average particle diameter below about 600 microns; at least part of said antimony catalyst compound being reduced to metallic antimony by the time said powdered prepolymer is formed thereby imparting a gray coloration to said powdered prepolymer; and
    (e) thereafter, in a solid phase polymerization step, involving the use of recycled, hot inert gas, converting said powdered prepolymer at a temperature between about 320° F. and about 425° F. in a bed which is fluidized with an inert gas stream until said superpolyester having an intrinsic viscosity of from about 0.5 to about 1.0 is formed; said inert gas stream being passed through a molecular sieve prior to being brought into contact with said powdered prepolymer;
the improvement which comprises maintaining in said inert gas stream, during at least a portion of step (e), (1) at least about 0.005 weight percent of an oxidizable material selected from the group consisting of ammonia, acetaldehyde and ethylene glycol, and (2) between about 1 and about 6 volume percent of oxygen; the amount of time said oxygen and said oxidizable material is maintained in said inert gas stream being at least about 10 minutes, until sid gray coloration disappears.

2. An improved process as in claim 1, wherein said inert gas stream is largely nitrogen and said oxidizable material is ethylene glycol.

3. An improved process as in claim 1, wherein said inert gas stream is largely nitrogen and said oxidizable material is acetaldehyde.

4. An improved process as in claim 1, wherein said inert gas stream is largely nitrogen and said oxidizable material is ammonia.

References Cited

UNITED STATES PATENTS

| 3,075,952 | 1/1963 | Coover et al. | 260—75 |
| 3,330,809 | 7/1967 | Perlowski et al. | 260—75 |
| 3,342,782 | 9/1967 | Barkey et al. | 260—75 |

WILLIAM H. SHORT, Primary Examiner

LOUISE P. QUAST, Assistant Examiner

U.S. Cl. X.R.

260—45.7, 77

PO-1050
(5/69)

UNITED STATES PATENT OFFICE
CERTIFICATE OF CORRECTION

Patent No. 3,497,477          Dated February 24, 1970

Inventor(s) Kenneth T. Barkey and Walter L. Predmore, Jr.

It is certified that error appears in the above-identified patent and that said Letters Patent are hereby corrected as shown below:

In the Specification

In column 3, line 2 delete "build-up" and substitute therefor ---built-up---.

In column 4, line 5 delete "molecular sieve)" and substitute therefor ---(molecular sieve)---.

In column 4, line 30 delete "230°F." and substitute therefor ---320°F.---.

In column 5, line 25 delete "exidation" and substitute therefor ---oxidation---.

In column 5, line 71 delete "thereto"(second occurrence). and

In column 8, line 39 delete "'build-up'" and substitute therefor ---"built-up"---.

In column 9, line 48 delete "0.35".

In column 9, line 48 delete "ethylene glycol" and substitute therefor ---evolved methanol---.

In column 9, line 49 delete "zone," and substitute therefor---zone.---.

In column 9, line 57 delete "2mm. Hg." and substitute therefor ---2mm.-Hg.---.

PO-1050
(5/69)

UNITED STATES PATENT OFFICE
CERTIFICATE OF CORRECTION

PAGE - 2

Patent No. 3,497,477  Dated February 24, 1970

Inventor(s) Kenneth T. Barkey and Walter L. Predmore, Jr.

It is certified that error appears in the above-identified patent and that said Letters Patent are hereby corrected as shown below:

<u>In the Specification Con't.</u>

In column 10, line 3 delete "materail" and substitute therefor ---material---.

In column 10, line 36, delete "420%F." and substitute therefor ---420°F.---.

In column 11, line 24 delete "foctors" and substitute therefor ---factors---.

<u>In the Claims</u>

In column 12, line 49 delete "sid" and substitute therefor ---said---.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents